United States Patent
Lin et al.

(10) Patent No.: US 7,145,852 B2
(45) Date of Patent: Dec. 5, 2006

(54) METHOD AND APPARATUS FOR DECODING ENCODED DATA AROUND A LINKING AREA ON AN OPTICAL STORAGE MEDIUM

(75) Inventors: Meng-Hsueh Lin, Taipei Hsien (TW); Chin-Huo Chu, Kao-Hsiung Hsien (TW); Chia-Wen Lee, Taipei Hsien (TW)

(73) Assignee: MediaTek Incorporation, Hsin-Chu Hsien (TW)

( * ) Notice: Subject to any disclaimer, the term of this patent is extended or adjusted under 35 U.S.C. 154(b) by 82 days.

(21) Appl. No.: 10/906,773

(22) Filed: Mar. 6, 2005

(65) Prior Publication Data

US 2006/0198270 A1  Sep. 7, 2006

(51) Int. Cl.
*G11B 5/09* (2006.01)
(52) U.S. Cl. .............................. 369/47.34; 369/47.32; 369/124.07

(58) Field of Classification Search .......... 369/124.07, 369/30.12, 53.44, 30.11, 47.12, 47.34, 47.32, 369/47.31, 53.24, 13.11, 275.1, 44.35, 44.41, 369/53.21; 386/95, 126
See application file for complete search history.

(56) References Cited

U.S. PATENT DOCUMENTS

| | | | | |
|---|---|---|---|---|
| 6,298,030 B1 * | 10/2001 | Maeda | ................... | 369/124.07 |
| 6,343,054 B1 * | 1/2002 | Maeda | ................... | 369/47.32 |
| 6,687,206 B1 * | 2/2004 | Masui | ................... | 369/47.19 |

* cited by examiner

*Primary Examiner*—Ali Neyzari
(74) *Attorney, Agent, or Firm*—Winston Hsu

(57) ABSTRACT

A method for decoding encoded data around a linking area on an optical storage medium includes: detecting at least one type of sync patterns within the encoded data; determining an offset value corresponding to the linking area according to the detected sync patterns; and decoding the encoded data according to the offset value for generating decoded data.

16 Claims, 4 Drawing Sheets

METHOD AND APPARATUS FOR DECODING ENCODED DATA AROUND A LINKING AREA ON AN OPTICAL STORAGE MEDIUM

BACKGROUND

The present invention relates to optical storage devices, and more particularly, to a method and apparatus for decoding encoded data around a linking area on an optical storage medium.

Data can be repeatedly recorded on an optical storage medium such as a DVD+RW disc, a DVD-RW disc, or a Blu-ray disc. This means that multiple sets of data can be recorded on the optical storage medium at various times. In an ideal case, a boundary of a second set of data recorded after a first set of data is right next to the first set of data so the adjacent sets of data appear to be continuous. In other words, there is no overlap or blank region around the linking area of the adjacent sets of data.

In reality, however, there usually exists an overlap or blank region around the linking area of the adjacent sets of data due to certain factors such as inaccuracy of a clock signal or occurrence of an error during addressing. In the worst case, the overlap region introduces a decoding error of recorded data corresponding to a whole error correction unit, e.g. an error correction code (ECC) block (for DVD+RW discs or DVD-RW discs) or a cluster (for Blu-ray discs), if too many portions within the error correction unit are shifted due to the overlap region.

SUMMARY

A method and apparatus for decoding encoded data around a linking area on an optical storage medium are disclosed. According to one embodiment of the present invention, the method comprises: detecting at least one type of sync patterns within the encoded data; determining an offset value corresponding to the linking area according to the detected sync patterns; and decoding the encoded data according to the offset value for generating decoded data.

According to one embodiment of the present invention, the apparatus comprises: a sync pattern detector for detecting at least one type of sync patterns within the encoded data; an offset detector coupled to the sync pattern detector for determining an offset value corresponding to the linking area according to the detected sync patterns; and a decoding module coupled to the offset detector for decoding the encoded data according to the offset value to generate decoded data.

DETAILED DESCRIPTION

Figure 1:
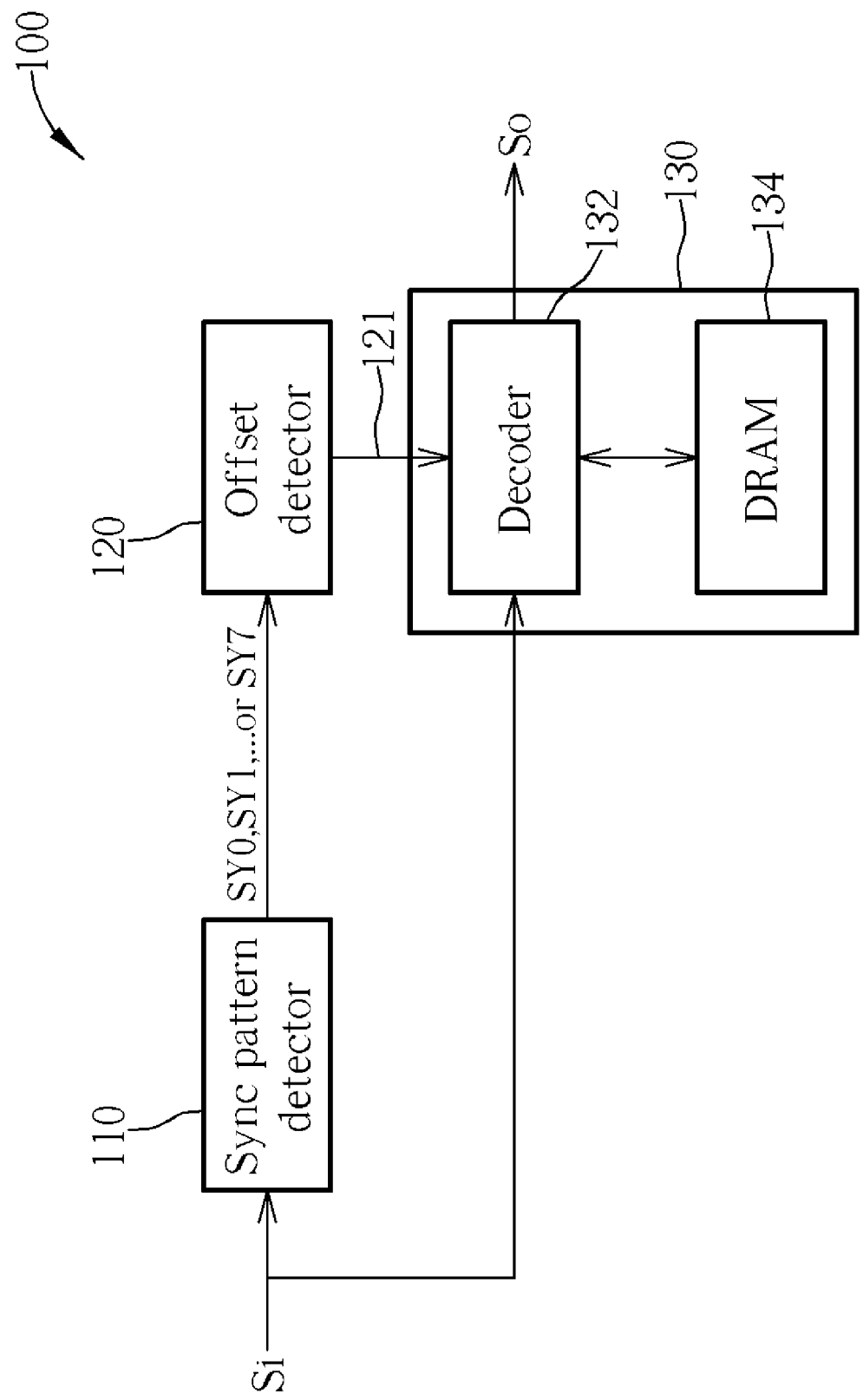
FIG. 1 is a diagram of an apparatus for decoding encoded data around a linking area on an optical storage medium according to an embodiment of the present invention.

Please refer to FIG. 1. FIG. 1 is a diagram of an apparatus 100 for decoding encoded data around a linking area on an optical storage medium according to a first embodiment of the present invention. An optical storage device for accessing the optical storage medium reads the encoded data utilizing a pickup head and generates an encoded data signal Si carrying the encoded data. In this embodiment, the optical storage medium is a DVD-RW disc and the optical storage device is a DVD-RW drive. Accordingly, the encoded data signal Si is an EFM+ data signal.

According to this embodiment, the apparatus 100 is installed in the optical storage device. The apparatus 100 comprises a sync pattern detector 110, an offset detector 120, and a decoding module 130, where the decoding module 130 comprises a decoder 132 and a Dynamic Random Access Memory (DRAM) 134. As shown in FIG. 1, the sync pattern detector 110 detects at least one type of sync patterns within the encoded data carried by the encoded data signal Si. In a simplest case, the sync pattern detector 110 may detect only one type of sync patterns SY0 out of all types of sync patterns SY0, SY1, . . . , SY7 shown in FIG. 1, where the sync patterns SY0 are expected to be detected in the beginning of each sector of the encoded data. In this manner, the offset detector 120 receives the location of sync patterns SY0 detected by the sync pattern detector 110 and determines at least one offset value carried by an offset information signal 121. Here, the offset value can be detected by measuring the time interval between a first time point when a first sync pattern is detected and a second time point when a second sync pattern (e.g. the next sync pattern comes after the first sync pattern in the simplest case mentioned above) is detected, where the time interval is typically measured by counting a reference clock, e.g. the data clock or another reference clock corresponding to the data clock. Thus, the physical meaning of the offset value is the distance between the position of the first sync pattern and the position of the second sync pattern along a track or a groove on a disc, with respect to the frequency of the reference clock. It is noted that the offset value should be a regular value except in the case of a linking area where there exists any abnormal phenomenon such as an overlap or blank region mentioned above. The offset detector 120 of this embodiment is capable of determining the offset value corresponding to the linking area according to the positions of the detected sync patterns SY0 to notify the decoding module 130 of the abnormal phenomenon. As a result, the decoding module 130 decodes the encoded data carried by the encoded data signal Si according to the offset value to generate decoded data, which is outputted in an output signal So.

Figure 2:
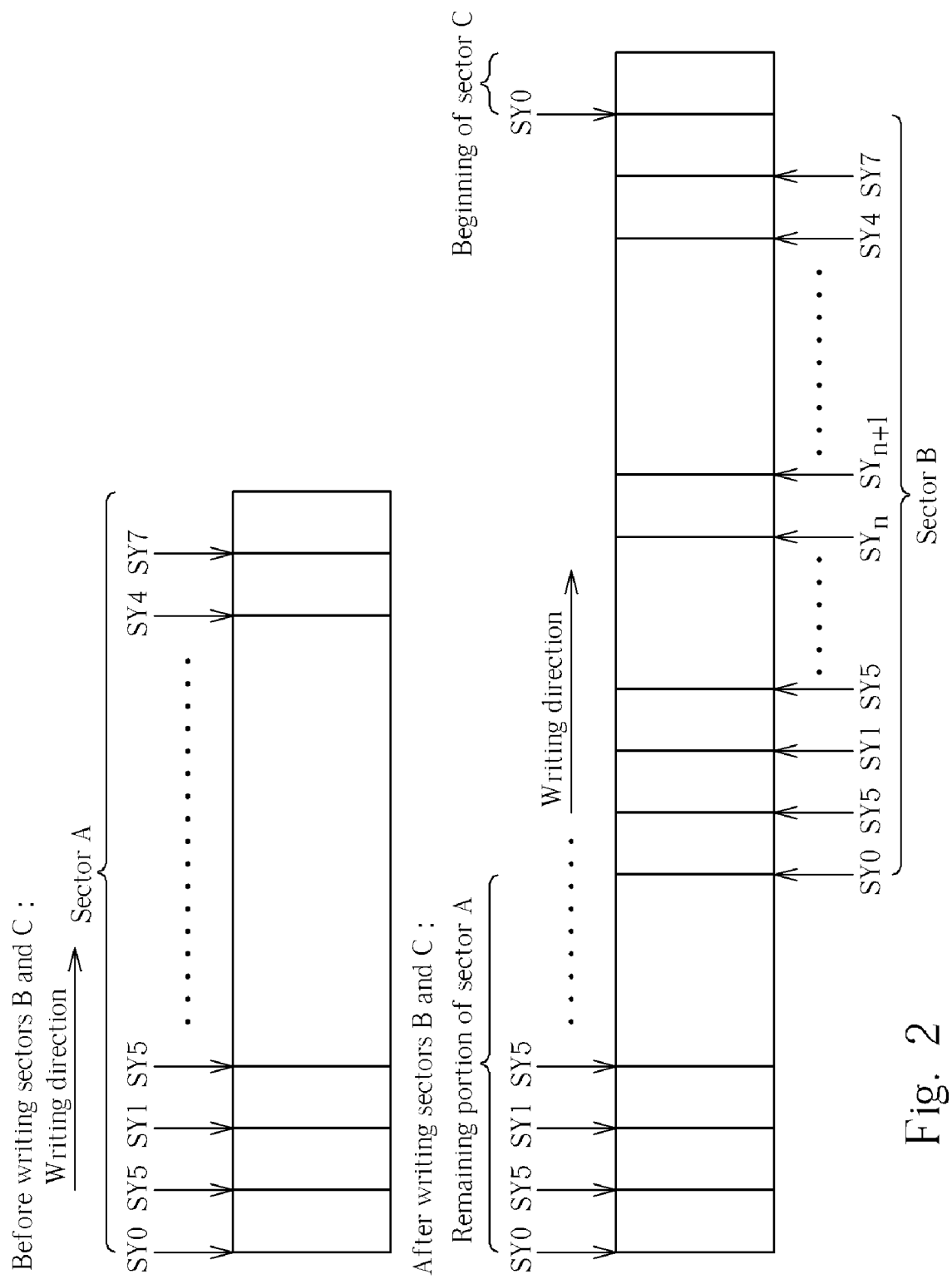
FIG. 2 represents a portion of encoded data around a linking area on an optical storage medium according to an embodiment.

FIG. 2 represents a portion of encoded data around a linking area on the optical storage medium according to the first embodiment, where a portion of sector A located at the ending of a first set of data recorded at a first time is erased while sector B located at the beginning of a second set of data recorded at a second time is written on the optical storage medium. If the offset value is generated according to detection of the offset between sync pattern SY0 of sector A and sync pattern SY0 of sector B, the offset value will not be a regular value corresponding to the period of a normal sector. In this situation, the offset value will be an abnormal value and will be less than the regular value. After receiving the offset value carried by the offset information signal 121, the decoding module 130 is notified of the situation shown in FIG. 2.

Figure 3:
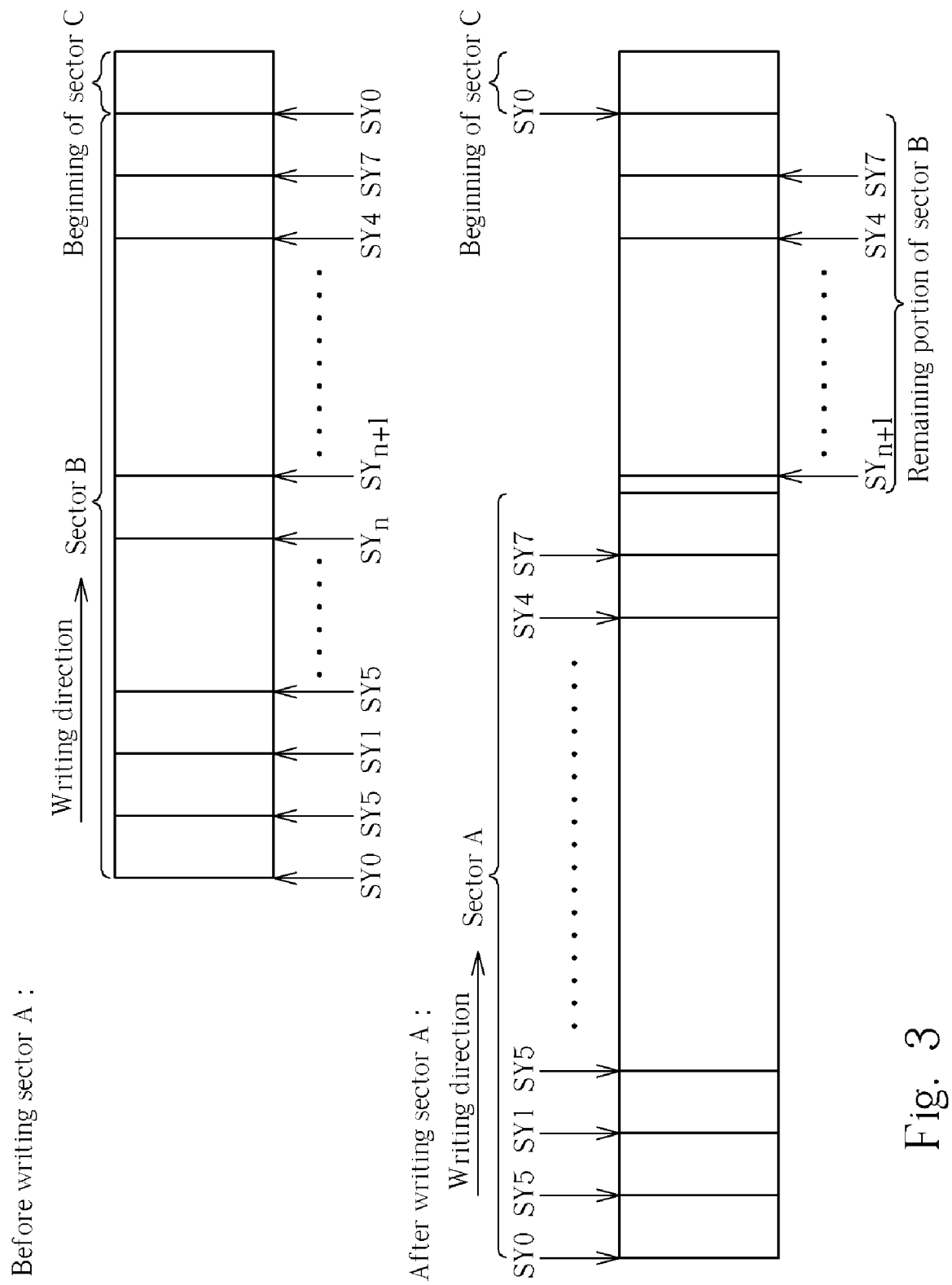
FIG. 3 represents a portion of encoded data around another linking area on an optical storage medium according to an embodiment.

FIG. 3 represents a portion of encoded data around another linking area on another optical storage medium similar to the previous one according to the first embodiment, where a portion of sector B located at the beginning of a third set of data recorded at a third time is erased while sector A located at the ending of a fourth set of data recorded at a fourth time is written on this optical storage medium. If the offset value is generated according to detection of the offset between sync pattern SY0 of sector A and sync pattern SY0 of sector C adjacent to sector B as shown in FIG. 3, the offset value will not be the regular value corresponding to the period of a normal sector. In this situation, the offset value will be an abnormal value and will be greater than the regular value. After receiving the offset value carried by the offset information signal 121, the decoding module 130 is notified of the situation shown in FIG. 3.

Figure 4:
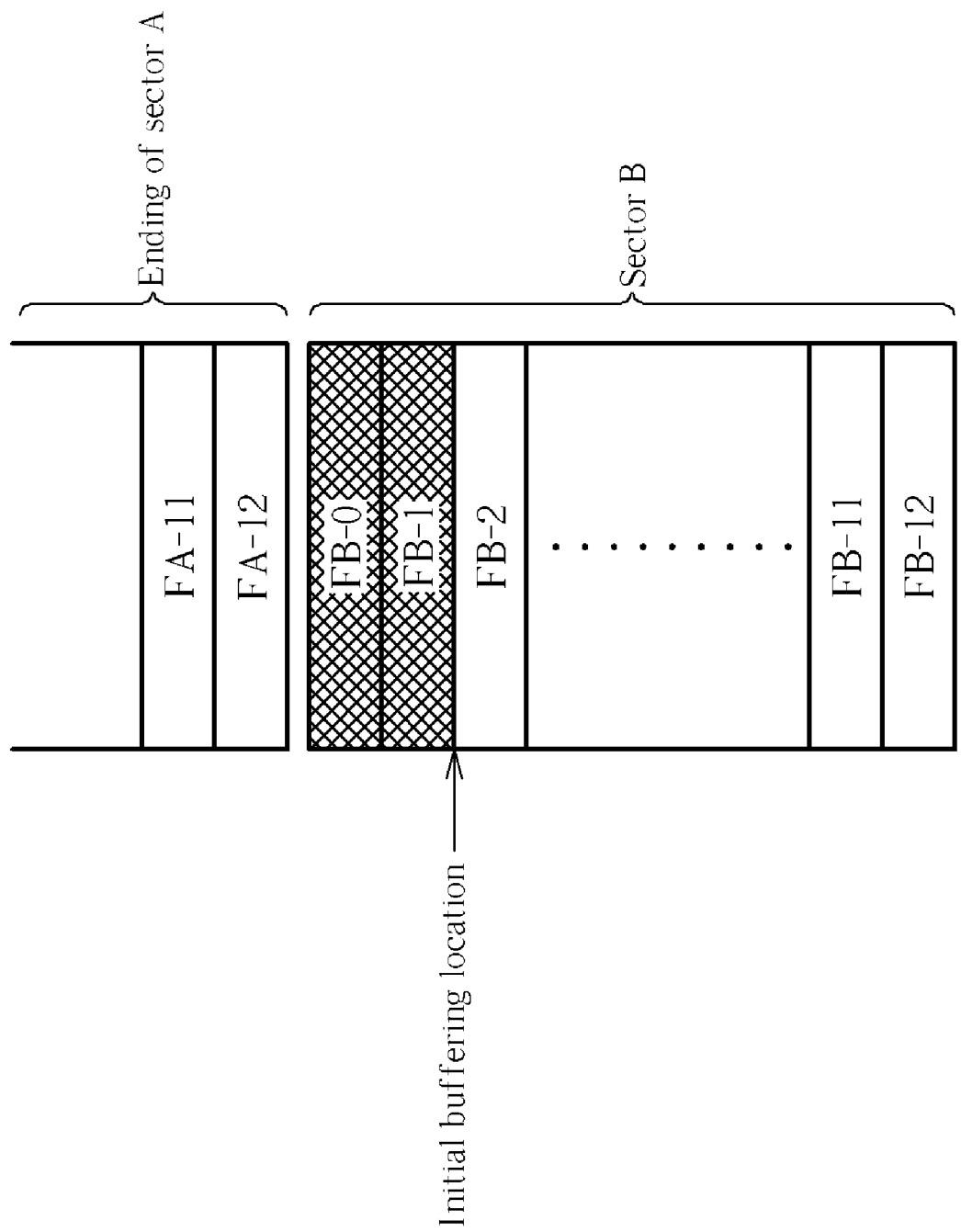
FIG. 4 illustrates an example of buffered data stored in the DRAM shown in FIG. 1.

FIG. 4 represents buffered data stored in the DRAM 134 shown in FIG. 1. Take the situation shown in FIG. 3 as an example with an assumption that a previously written frame FB-0 and a portion of a previously written frame FB-1 of sector B are overlapped by a portion of sector A. In this embodiment, if a regular value corresponding to the period of a normal frame is denoted as To, then the regular value corresponding to the period of a normal sector is denoted as 13To since a sector comprises thirteen frames. The detection of the offset between sync pattern SY0 of sector A and sync pattern SY0 of sector C indicates that the abnormal value is slightly greater than 24To since almost up to two frames out of the twenty-six frames of sectors A and B are overlapped. For example, if eighty percents of the previously written frame FB-1 is erased, then the abnormal value detected by the offset detector 120 is 24.2To. The offset detector 120 may simply output the abnormal value as the offset value (which is carried by the offset information signal 121), so after receiving the offset value carried by the offset information signal 121, the decoding module 130 is notified that a portion of sector B is erased, where frame FB-0 and eighty percents of frame FB-1 are erased according to the calculations such as those described in the following equations:

$$13To*2-24.2To=1.8To; \text{ and}$$

$$1.8To \div To = 1, \text{ where the remainder is equal to 80\%.}$$

While other frames such as frames FA-11 and FA-12 of sector A and frames FB-2, . . . , FB-12 of sector B are buffered in the DRAM 134 normally as shown in FIG. 4, the decoding module 130 leaves a region for storing frames FB-0 and FB-1 of sector B in the DRAM 134 to be blank or unchanged, or simply fills this region with a certain value e.g. zero as a note. In this manner, the decoder 132 is capable of decoding frames FB-2, . . . , FB-12 rather than erroneously decoding the whole sector B. As a result, frame overlapping does not cause erroneously storing the encoded data, for example, frame FB-2 of sector B, in the region for storing frame FB-0 in the DRAM 134. It is noted that, although in FIG. 1 the data flow between the decoder 132 and the DRAM 134 indicates that the decoder 132 plays a role of buffering control such as that shown in FIG. 4, it is an implementation choice and not meant to be a limitation of the present invention. In another embodiment of the present invention, the functionality of buffering control mentioned above is implemented utilizing a buffering control unit playing the same role in the decoding module 130.

A second embodiment of the present invention is similar to the first embodiment, where the difference between the first and second embodiments is described as follows. In the first embodiment, the decoding module 130 buffers the encoded data into the DRAM 134 according to the offset value carried by the offset information signal 121 as previously described, and then the decoder 132 decodes the buffered data in the DRAM 134 to generate the decoded data. However, in the second embodiment, the decoding module 130 buffers the encoded data into the DRAM 134 normally, without leaving a region such as the region for storing frames FB-0 and FB-1 of sector B mentioned above to be blank or unchanged, or filling this region with a certain value. In this manner, the decoder 132 reads the buffered data in the DRAM 134 according to the offset value carried by the offset information signal 121 to decode the buffered data, in order to generate the decoded data as if the encoded data corresponding to the erased portion such as frames FB-0 and FB-1 of sector B mentioned above has been completely read. As an implementation choice rather than a limitation of the present invention, the decoder 132 may generate the decoded data by utilizing null data substituted for the encoded data corresponding to the erased portion, or by utilizing erasure information for notification of skipping decoding of the erased portion.

In a variation of either the first embodiment or the second embodiment, functionalities of at least one portion of the sync pattern detector 110 and the offset detector 120 are activated in the apparatus 100 when the decoding module 130 or a certain error detection module in the optical storage device asserts an activation signal for notifying the apparatus 100 of abnormal phenomena such as the overlap or blank region mentioned above; so the sync pattern detector 110 and the offset detector 120 in this variation simply perform their own roles when activated.

In another variation of either the first embodiment or the second embodiment, the sync pattern detector 110 detects multiple types of sync patterns within the encoded data carried by the encoded data signal Si, so the offset detector 120 may determine the offset value by checking if a sequence of the sync patterns complies with a specification of the optical storage medium. If the quality of an encoded data signal Si is considerably poor, checking if the sequence of the sync patterns complies with a predetermined sequence, e.g. a sequence {SY0, SY5, SY1, SY5}, will strengthen the reliability of the detection performed by the sync pattern detector 110 or the offset detector 120.

In another variation of either the first embodiment or the second embodiment, the sync pattern detector 110 also detects multiple types of sync patterns within the encoded data carried by the encoded data signal Si, the difference being, the offset detector 120 determines the offset value as follows. The offset detector 120 of this variation checks if a sequence of a plurality of continuous sync patterns outputted from the sync pattern detector 110 complies with any of all the sequences allowable according to the specification of the optical storage medium. Taking the situation shown in FIG. 3 as an example, the offset detector 120 receives the sequence {SY4, SY7, $SY_{n+1}$, $SY_{n+2}$} and finds the abnormal phenomenon in the linking area. The sequence {SY4, SY7} indicates the relative location of the last frame corresponding to the sync pattern SY7 with respect to sector A, and the sequence {$SY_{n+1}$, $SY_{n+2}$} indicates the relative location of the frame corresponding to sync pattern $SY_{n+1}$ with respect to sector B. Therefore, the offset detector 120 detects and generates the offset value according to the two relative locations. It is noted that if sync pattern $SY_{n+1}$ in the sequence {SY4, SY7, $SY_{n+1}$, $SY_{n+2}$} mentioned above is not supposed to be repeated in any sector according to the specification of the optical storage medium, the offset detector 120 may determine the relative location of the frame corresponding to sync pattern $SY_{n+1}$ with respect to sector B according to sync pattern $SY_{n+1}$ rather than both sync patterns of the sequence $\{SY_{n+1}, SY_{n+2}\}$. According to another embodiment, the offset value carried by the offset information signal 121 can be sent to the decoding module 130 utilizing various forms reflecting information related to the offset value as long as the implementation of the present invention is not hindered.

Although the embodiments are described utilizing the DVD-RW disc and the DVD-RW drive as the optical storage medium and the optical storage device, respectively, this is not a limitation. Other kinds of optical storage media such as a DVD+RW disc or a Blu-ray disc and the corresponding optical storage device such as a DVD+RW drive or a Blu-ray drive are applicable to other embodiments of the present invention.

It is an advantage of the present invention that encoded data around a linking area on the optical storage medium such as a DVD+RW disc, a DVD-RW disc, or a Blu-ray disc are rarely abandoned in units of the whole error correction unit such as an ECC block.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for decoding encoded data around a linking area on an optical storage medium, comprising:
    (a) detecting at least one type of sync patterns within the encoded data;
    (b) determining an offset value corresponding to the linking area according to the detected sync patterns; and
    (c) decoding the encoded data according to the offset value to generate decoded data.

2. The method of claim 1, wherein step (c) further comprises:
    buffering the encoded data according to the offset value to generate buffered data; and
    decoding the buffered data to generate the decoded data.

3. The method of claim 1, wherein step (c) further comprises:
    buffering the encoded data to generate buffered data; and
    reading the buffered data according to the offset value to decode the buffered data for generating the decoded data.

4. The method of claim 1, wherein the offset value is determined according to two sync patterns having the same type.

5. The method of claim 1, wherein step (b) further comprises determining the offset value through checking if a sequence of the sync patterns complies with a specification of the optical storage medium.

6. The method of claim 1, wherein the optical storage medium is a rewritable optical disc.

7. The method of claim 1, wherein the encoded data is recorded discontinuously on the optical storage medium.

8. An apparatus for decoding encoded data around a linking area on an optical storage medium, comprising:
    a sync pattern detector for detecting at least one type of sync patterns within the encoded data;
    an offset detector coupled to the sync pattern detector for determining an offset value corresponding to the linking area according to the detected sync patterns; and
    a decoding module coupled to the offset detector for decoding the encoded data according to the offset value to generate decoded data.

9. The apparatus of claim 8, wherein the decoding module further comprises:
    a buffer for buffering the encoded data to generate buffered data; and
    a decoder coupled to the buffer for decoding the buffered data to generate the decoded data.

10. The apparatus of claim 9, wherein the decoding module buffers the encoded data into the buffer according to the offset value.

11. The apparatus of claim 9, wherein the decoder reads the buffered data according to the offset value to decode the buffered data for generating the decoded data.

12. The apparatus of claim 9, wherein the buffer is a random access memory (RAM).

13. The apparatus of claim 8, wherein the offset detector determines the offset value according to two sync patterns having the same type.

14. The apparatus of claim 8, wherein the offset detector determines the offset value through checking if a sequence of the sync patterns complies with a specification of the optical storage medium.

15. The apparatus of claim 8, wherein the optical storage medium is a rewritable optical disc.

16. The apparatus of claim 8, wherein the encoded data is recorded discontinuously on the optical storage medium.

* * * * *